Nov. 17, 1942.  R. G. LE TOURNEAU  2,302,614
RIPPER
Filed Aug. 18, 1941  2 Sheets-Sheet 1
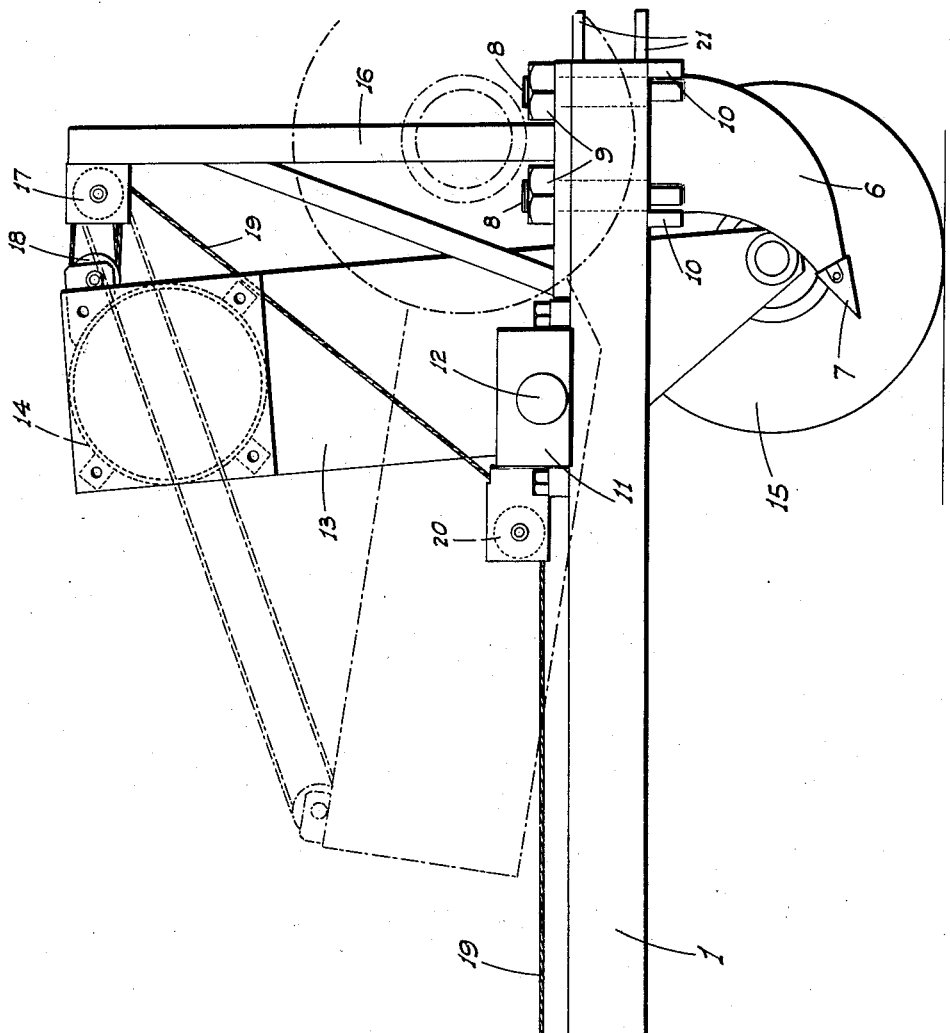
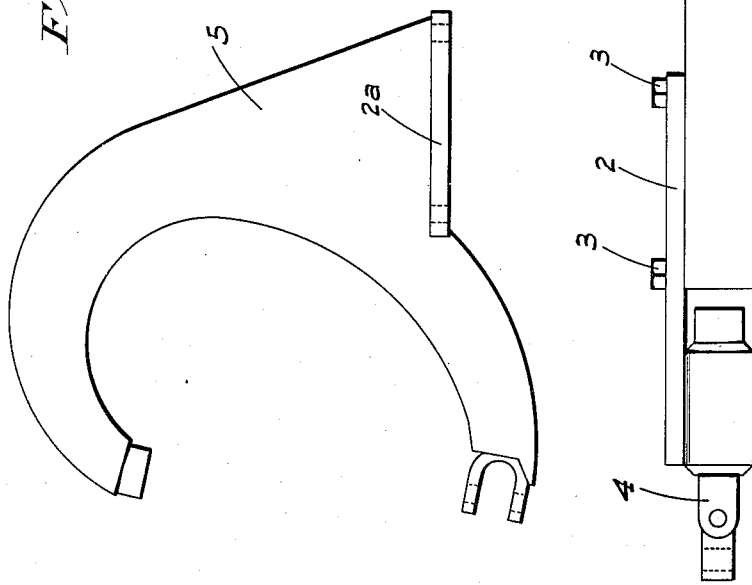
INVENTOR.
R. G. LeTourneau
ATTORNEYS Nov. 17, 1942.   R. G. LE TOURNEAU   2,302,614
RIPPER
Filed Aug. 18, 1941   2 Sheets-Sheet 2
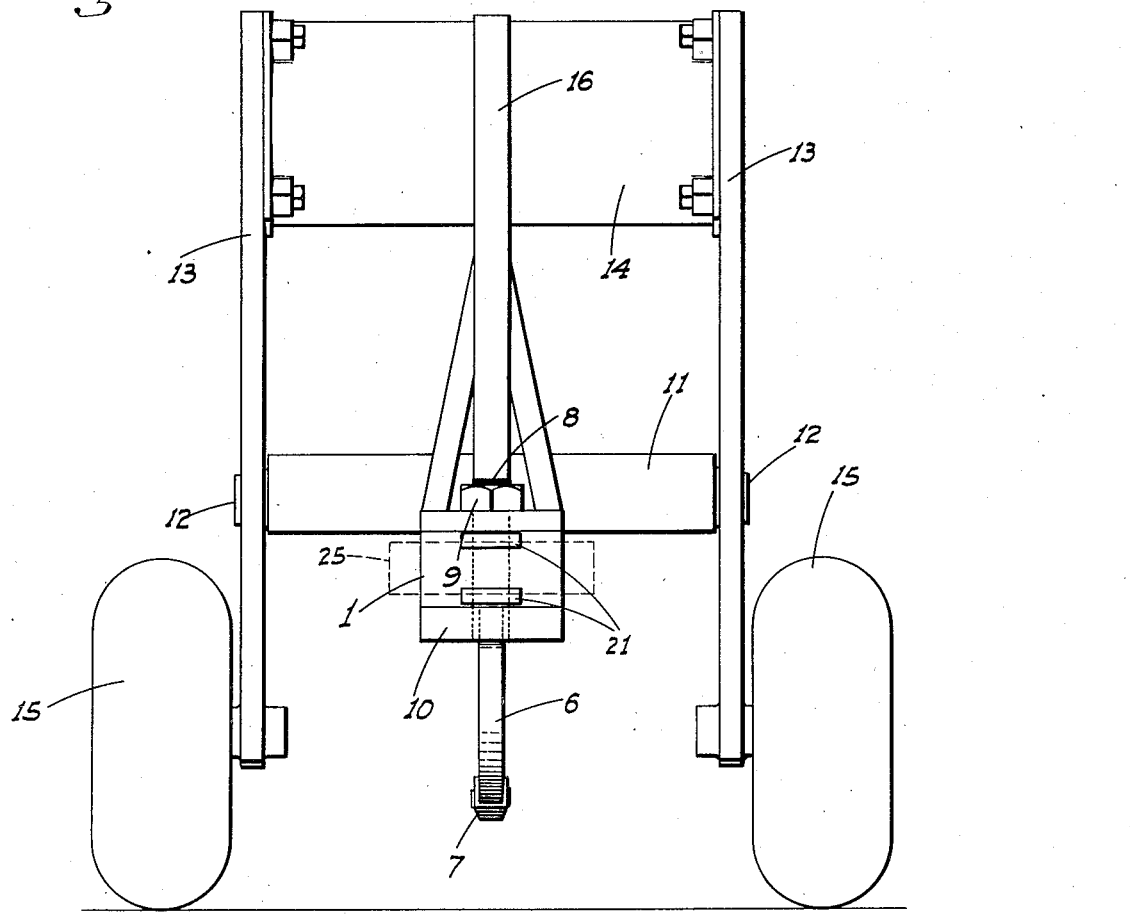
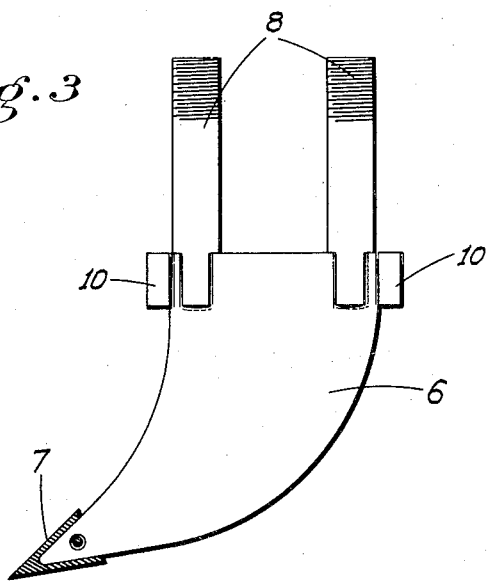
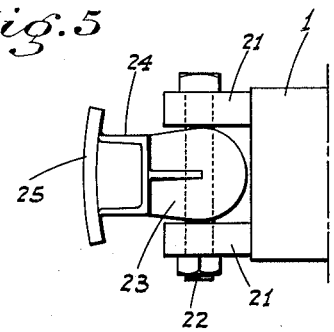
INVENTOR.
R. G. Le Tourneau
BY
Webster & Webster
ATTORNEYS Patented Nov. 17, 1942

2,302,614

UNITED STATES PATENT OFFICE 2,302,614

RIPPER

Robert G. Le Tourneau, Peoria, Ill., assignor to R. G. Le Tourneau, Inc., a corporation Application August 18, 1941, Serial No. 407,292

4 Claims. (Cl. 262—8)

This invention relates to ground ripping implements or rooters; my principal objects being to provide a single-tooth implement of this character so constructed that a greater concentration of weight is obtained over the one tooth, giving it excellent ground penetrating powers; one in which the frame is arranged and the tooth so mounted that the implement may be pushed or pulled along the ground when in operation; and one provided with interchangeable draft attachments, making it capable of being connected to a two-wheel tractor of the type shown generally in my Patent No. 2,189,072, dated February 6, 1940, or to a conventional endless track or similar tractor.

These objects I accomplish by means of such structure and relative arrangement of parts as will fully appear by a perusal of the following specification and claims.

In the drawings similar characters of reference indicate corresponding parts in the several views:

Figure 1 is a side elevation of the implement, detached from the draft tractor and with the supporting wheels lowered, and the near side arm and wheel removed; the fully raised position of said wheels being indicated in dotted lines.

Figure 2 is a rear end view of the implement.

Figure 3 is an enlarged view of the tooth detached.

Figure 4 is a side elevation of a draft yoke for connection to the tongue when the implement is to be attached to a two-wheel tractor.

Figure 5 is a side elevation of a rear-end bumper for the ripper.

Referring now more particularly to the characters of reference on the drawings, the frame of the implement comprises a long heavy tongue 1 of rectangular cross section, provided at its forward end with a draft attachment for connection with a tractor. For a conventional tractor such attachment comprises a plate 2 removably secured on the tongue by bolts 3. The plate projects ahead of the tongue and supports a swivel coupling unit 4 of standard type adapted for attachment to the usual draw-bar or clevis on the tractor. For a two-wheel tractor, the attachment comprises a plate 2a drilled for securing on the tongue by the bolts 3, and having an upstanding C-yoke 5 rigid therewith and provided with vertically spaced ends for supporting engagement with the cooperating and correspondingly spaced elements on the tractor.

A heavy tooth 6, curved lengthwise of the tongue to its lower end, is provided with a replaceable point 7. The tongue is flat along its top edge, which is relatively long lengthwise of the tongue. Heavy studs 8 are rigid with and project upwardly from the tooth adjacent the ends of said top edge, the studs removably projecting through vertical holes provided in the tongue adjacent its rear end and being removably secured by nuts 9 which act to clamp the flat top edge of the tooth against the corresponding flat bottom surface of the tongue. The tooth being considerably narrower transversely of the tongue than said tongue, transverse bars 10 are secured on the tooth at the front and back at the top and engage the under side of the tongue to give stability to the tooth against lateral deflection and taking some of the strains off the studs. By reason of this removable mounting of the tooth it may be easily removed for replacement or repair when necessary.

Secured on and extending transversely of the tongue a short distance ahead of the tooth is a cross beam 11 having laterally projecting trunnions 12 at its ends. Side arms 13 are pivoted intermediate their ends on the trunnions, being rigidly connected at their upper end by a hollow cylinder 14 which imparts great stiffness to the arm unit and which may be filled for weight if desired. At their lower end these arms support wheels 15 which are disposed laterally out from the arms. The length of the arms below the trunnions is such that when the arms are substantially vertical, the tooth is raised well clear of the ground, as shown in Fig. 1, for transportation. The arms are also arranged relative to the trunnions so that when the upper portions of said arms are swung forwardly so as to be substantially horizontal, the wheels clear the lower edge of the tongue, as shown in dotted lines in Fig. 1. In this manner the tooth may penetrate for its full height into the ground without interference.

The swinging of the arms, to determine the position of the wheels relative to the tooth is controlled by the following means:

Upstanding from the tongue at its rear end is a rigid post 16 on the upper end of which a forwardly facing sheave block 17 is mounted; a cooperating rearwardly facing sheave block 18 being mounted on the cylinder 14 at the back and top. A cable 19 is reeved between the sheaves of the blocks, forming a block and tackle unit, and extends thence downwardly and forwardly between the arms 13 under the cylinder and about a direction-changing pulley 20 mounted on the forward side of the beam 11, and thence to a power unit on the draft tractor. A pull on the cable thus pulls the arms up and lowers the wheels relative to the tongue, the weight of the tongue and of the upper portion of the arms relative to their lower portion and wheels causing the arms to swing forwardly of themselves and relatively raise the wheels when the cable is slacked.

The tongue, cross beam, post and arms are of solid steel, so that a very great weight is concentrated on the tongue. This not only gives excellent penetrating powers to the tooth, but enables the implement as a whole to withstand very heavy strains and to be thus used under conditions which ordinary rippers could not cope with. Since the tongue is very rigid and can withstand heavy compression strains, the ripper may be pushed by a booster tractor when the going is very heavy.

I therefore provide a rear bumper unit on the tractor for engagement with such booster tractor. This unit comprises vertically spaced ears 21 projecting from the rear end of the tongue, and which are orificed to receive a pivot bolt 22. This bolt turnably projects through a block 23 projecting forwardly from a rigid transversely extending bumper 24 and which includes a rear plate 25 convexly curved in a vertical plane.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A ground ripping implement including a tongue, adapted at its forward end for connection with a draft means, a tooth having a slope toward its lower end in a direction lengthwise of the tongue, the tooth at the top being flat and relatively long lengthwise of the tongue, a pair of centrally disposed studs rigid with and upstanding from the tooth adjacent the ends of the top thereof and removably projecting through the tongue and nuts on the upper end of the studs clamping the flat edge of the tooth against the under face of the tongue.

2. A ground ripping implement including a tongue, adapted at its forward end for connection with a draft means, a tooth narrower than the tongue depending therefrom, means removably securing the tooth on the tongue and relatively long crossbars on and rigid with the tooth at the top spaced lengthwise of the tongue and engaging the underface thereof.

3. A ground ripping implement including a tongue, adapted at its forward end for connection with a draft means, a tooth depending from the tongue adjacent its rear end, wheels disposed laterally out from the tongue adjacent its rear end, a cross beam rigid with the tongue adjacent its rear end, normally upstanding side arms pivotally supported intermediate their ends from the beam and on the lower end of which the wheels are mounted, a cross member connecting the arms above the beam, the portion of the arms above the pivot tending to swing forward and down of their own weight whereby to raise the wheels relative to the tongue, and means to pull said arms in the opposite direction.

4. A structure as in claim 3, in which said last named means comprises an upstanding rigid post on the tongue behind the cross beam, and a block and tackle connecting the post and the arm cross member.

ROBERT G. LE TOURNEAU.